UNITED STATES PATENT OFFICE.

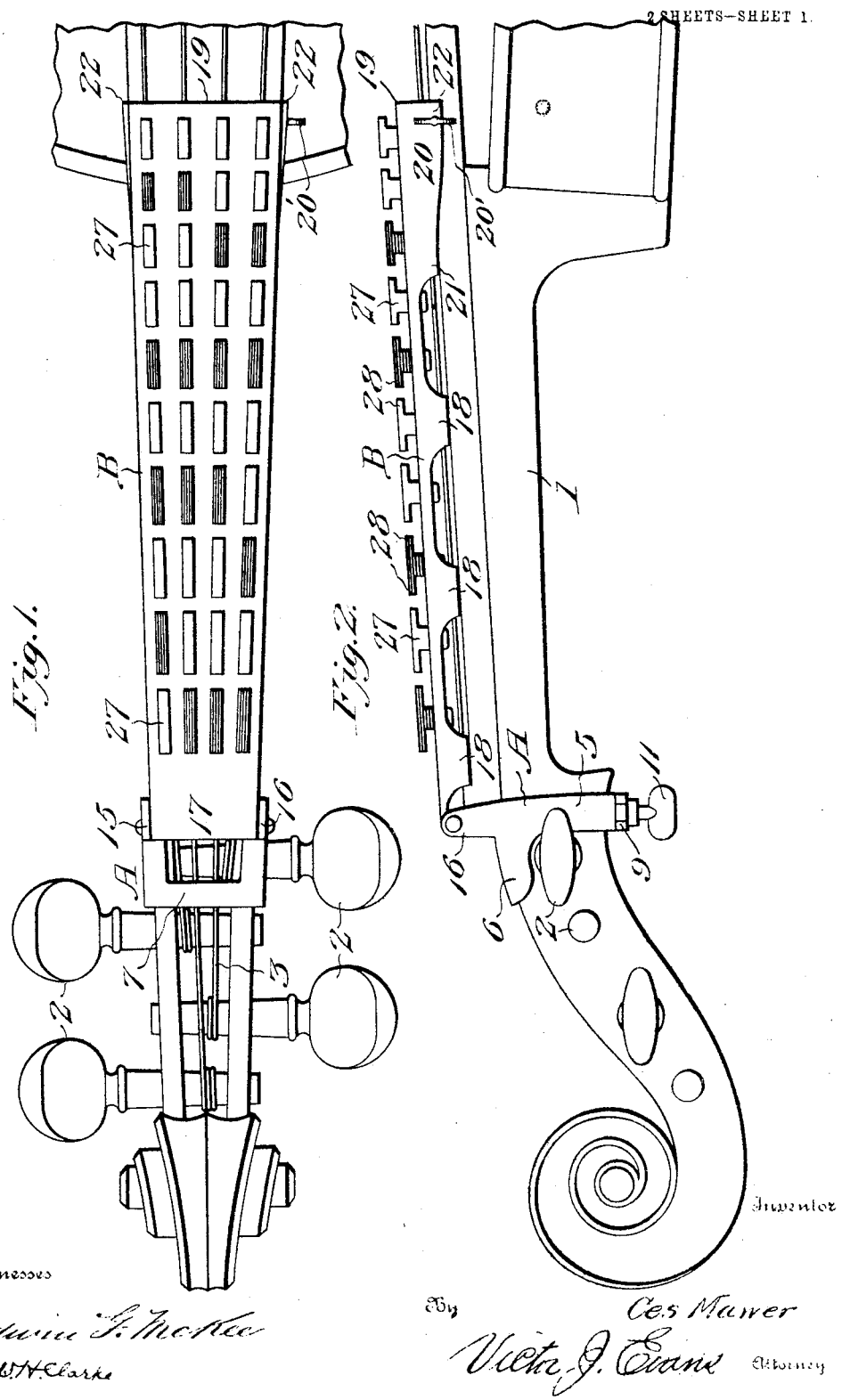

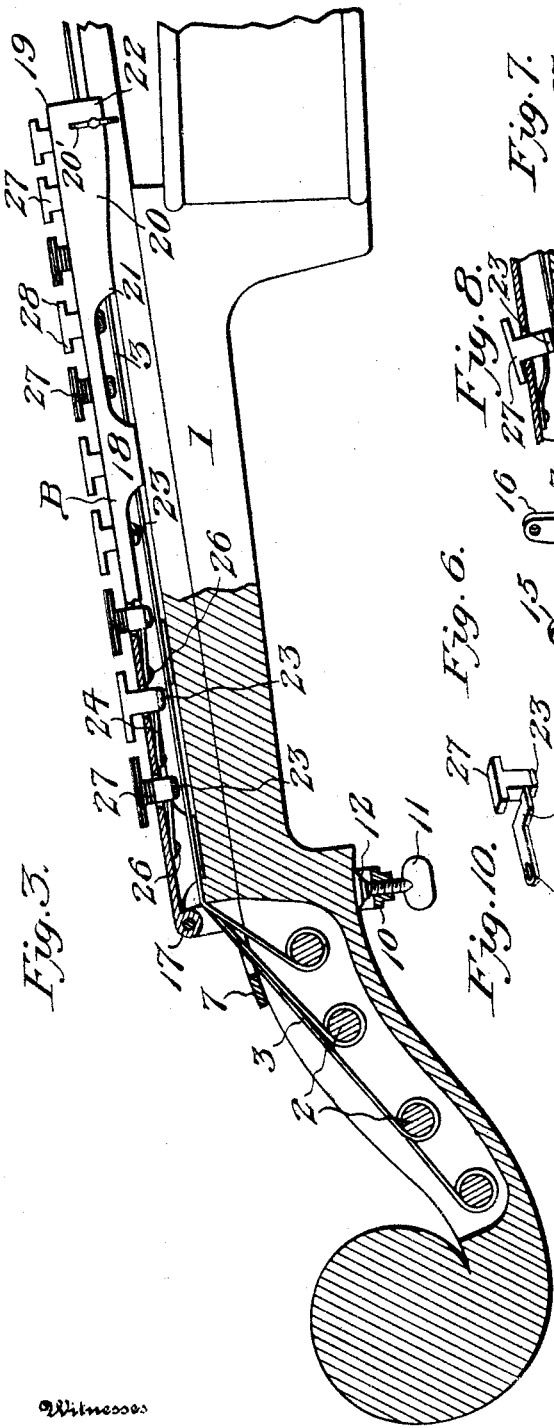

CES MAWER, OF HARPSTER, OHIO.

ATTACHMENT FOR STRINGED INSTRUMENTS.

No. 798,521.  Specification of Letters Patent.  Patented Aug. 29, 1905.

Application filed October 15, 1904. Serial No. 228,595.

*To all whom it may concern:*

Be it known that I, CES MAWER, a citizen of the United States, residing at Harpster, in the county of Wyandot and State of Ohio, have invented new and useful Improvements in Attachments for Stringed Instruments, of which the following is a specification.

This invention relates to stringed instruments such as employ in connection with the neck thereof a keyboard having a plurality of movable keys.

The objects of the invention are to improve and simplify the construction of such keyboards; furthermore, to increase their efficiency in operation.

With the foregoing and other objects in view the invention resides in the combination and arrangement of parts and in the details of construction hereinafter described and claimed as a practical embodiment thereof.

In the accompanying drawings, forming part of this specification, Figure 1 is a plan view of a stringed instrument having the improved keyboard of this invention secured to the neck thereof. Fig. 2 is a side elevation. Fig. 3 is a similar view, partly in section. Fig. 4 is a transverse section through the neck of the instrument and through the keyboard. Fig. 5 is an under plan view of the improved keyboard. Fig. 6 is a perspective view of the clamp used for hinging the keyboard to the neck of the instrument. Fig. 7 is a plan view illustrating a modified construction of the finger-pieces which are used in connection with the keyboard. Figs. 8 and 9 are longitudinal sections through the neck of the instrument and keyboard, showing the method of manipulating the finger-pieces when it is desired to secure a tremolo effect. Fig. 10 is a detail perspective view of one of the keys.

Like reference characters indicate corresponding parts in the different views.

The numeral 1 indicates the neck of a stringed instrument—such, for example, as a violin. The neck 1 is provided with the usual tuning-keys 2 for the strings 3. Surrounding the neck 1 is a removable clamp A, which, as shown in Fig. 6, is formed with the sides 4 and 5, having lateral offsets 6, connected by a cross-piece 7, having a cut-away portion 8, said cross-piece 7 being formed integral with the offsets 6 and extending across the front portion of the neck 1. As shown in Fig. 3, the cut-away portion 8 of the cross-piece 7 serves to prevent said cross-piece from contacting with the strings 3.

Hinged to the side piece 5, as shown at 9, is a cross-piece 10, which is intended to extend across the rear portion of the neck 1. The cross-piece 10 is provided with a tightening-screw 11, having a swiveled head 12, adapted to abut against the rear portion of the neck 1. The cross-piece 10 is also formed with a bent lip or flange 13, having a perforation therein to receive a screw 14. By means of the hinged cross-piece 10 the clamp A can be removed from the neck of the instrument whenever desired.

The sides 4 and 5 of the clamp A are formed with extensions 15 and 16, between which the forward end of the keyboard B is hinged, as shown at 17. The keyboard B is formed along its side edges with integral flanges 18, which bear against the front portion of the neck 1, the spaces between said flanges serving to prevent any muffling of the sound of the strings. At its free end 19 the hinged keyboard B is formed on each of its sides with flanges 20, which are twisted in such manner that the portion 21 of each flange rests against the front portion of the neck 1, and the portion 22 of each flange extends over the corner of said neck and rests against the side thereof. The purpose of the twisted flanges 20 is to prevent the formation of a shoulder, against which the hand of the player might strike in moving to and fro upon the neck of the instrument.

The keyboard B is provided with a plurality of keys having contacting portions 23, provided with felt or other suitable material, as indicated in Fig. 5. The flexible or spring-supporting portion 24 of each key is formed with a longitudinal slot 25, through which extends a screw 26, fitting into a suitable socket in the keyboard. By means of the slots 25 and screws 26 the keys may be adjusted longitudinally upon the keyboard to a slight extent in order to secure contact with the strings at the proper points. At the lower portion or end 19 of the keyboard the contact portion 23 of each key is laterally offset with respect to the spring portion 24, whereby the contacting portions of the various keys may be disposed close to each other without interfering with the length of the resilient or spring portion 24. In addition to the contacting portion 23 and the spring-supporting portion 24 each of the keys also includes a finger-piece, such as 27, having longitudinal extensions 28 at each end. By pressing first on one end 28 of the finger portion of each key and then upon the other end, so as to flex the spring-supporting portion 24, as indicated in Figs. 8 and 9, a tremolo effect may be produced, such manipulation of the keys causing first the corner 29 and then the corner 30 of the contacting portion 23 to contact with the string.

From the foregoing description it will be apparent that the expression "key" is intended to describe a construction comprising a spring-supporting portion, a contacting portion, and a finger-piece.

In order to develop greater skill in playing the instrument, the longitudinal extensions 28 of the finger-pieces 27 may be dispensed with, as indicated in Fig. 7. It will be apparent that greater skill will be required to manipulate the small finger-pieces shown in Fig. 7 than will be required to manipulate the comparatively large finger-pieces shown in Figs. 1, 2, and 3.

As indicated in Fig. 1, the finger-pieces of a portion of the keys are darkened or shaded in any suitable manner to distinguish them clearly from the remaining keys.

By hinging the improved keyboard to the neck of the instrument said keyboard may be moved away from the neck without detaching it therefrom when it is necessary to place a new set of strings upon the instrument. In the event that it is desired to dispense entirely with the keyboard the clamp A, together with the keyboard B, is detached from the neck 1.

The twisted flanges 20, preferably, are provided with wing-nuts 20' to secure the keyboard rigidly in position upon the neck of the instrument.

Changes in the precise embodiment of invention illustrated and described may be made within the scope of the following claims without departing from the spirit of the invention or sacrificing any of its advantages.

Having thus described the invention, what is claimed is—

1. The combination with a stringed instrument, of a keyboard therefor, and a yieldingly-supported key mounted on said keyboard to rock longitudinally of the springs.

2. A stringed instrument having a detachable clamp thereon, and a keyboard hinged to said clamp, having twisted flanges for the purpose specified.

3. A stringed instrument having a keyboard secured to the neck portion thereof, said keyboard being provided with twisted flanges contacting with the front and side portions of said neck.

4. The combination with a stringed instrument, of a keyboard having keys formed with flexible supporting portions, attached to the keyboard and contacting portions laterally offset with respect to the supporting portions, for the purpose specified.

5. The combination with a stringed instrument, of a keyboard having keys formed with flexible supporting portions adjustably attached to the keyboard, and contacting portions laterally offset with respect to the supporting portions for the purpose specified.

6. The combination with a stringed instrument, of a detachable keyboard having keys provided with supporting portions formed with longitudinal slots, and screws extending through said slots and into said keyboard.

7. The combination with the neck of a stringed instrument, of a keyboard having keys provided with flexible supporting portions, and finger-pieces connected with said keys and having longitudinal extensions for the purpose specified.

8. A detachable keyboard for stringed instruments, having adjustable springs thereon, contacting portions laterally offset from said springs, and finger-pieces connected with said springs and contacting portions, and having longitudinal extensions for the purpose specified.

9. The combination with a stringed instrument, of a clamp surrounding the neck thereof, said clamp having side pieces formed with lateral offsets, a cross-piece connecting said offsets and having a cut-away portion, a second cross-piece hinged to one of said side pieces and adapted to be detachably secured to the other, a clamping member on said hinged cross-piece, extensions on said side pieces, a keyboard hinged to said extensions, keys on said keyboard, and twisted flanges on said keyboard bearing against the front and side portions of the neck of the instrument, for the purpose specified.

In testimony whereof I affix my signature in presence of two witnesses.

CES MAWER.

Witnesses:
H. H. NEWELL,
J. E. STAGGS.